United States Patent
Li et al.

(10) Patent No.: US 8,000,231 B2
(45) Date of Patent: Aug. 16, 2011

(54) METHOD, SYSTEM, AND APPARATUS FOR NETWORK DEVICE TO ACCESS PACKET SWITCHED NETWORK

(75) Inventors: Jian Li, Shenzhen (CN); Hong Lv, Shenzhen (CN); Yuping Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/833,818

(22) Filed: Jul. 9, 2010

(65) Prior Publication Data

US 2010/0271933 A1 Oct. 28, 2010

Related U.S. Application Data

(63) Continuation of application No. PCT/CN2009/070067, filed on Jan. 7, 2009.

(30) Foreign Application Priority Data

Jan. 10, 2008 (CN) .......................... 2008 1 0001013

(51) Int. Cl.
*H04J 3/14* (2006.01)
*H04J 3/26* (2006.01)
*H04L 12/26* (2006.01)

(52) U.S. Cl. .................... 370/219; 370/242; 370/432

(58) Field of Classification Search .......... 370/216–218, 370/219, 242, 254, 312, 432
See application file for complete search history.

(56) References Cited

U.S. PATENT DOCUMENTS

| | | | |
|---|---|---|---|
| 6,754,228 B1 | 6/2004 | Ludwig | |
| 7,486,610 B1 * | 2/2009 | Bhupalam et al. | 370/216 |
| 7,486,611 B1 * | 2/2009 | Wilson | 370/220 |
| 7,599,286 B2 * | 10/2009 | Bhogavilli et al. | 370/217 |
| 7,630,392 B2 * | 12/2009 | Raza | 370/432 |
| 7,664,043 B1 * | 2/2010 | D'Souza et al. | 370/242 |
| 7,782,764 B2 * | 8/2010 | Zi | 370/218 |
| 2007/0253326 A1 * | 11/2007 | Saha et al. | 370/217 |
| 2008/0159154 A1 * | 7/2008 | Bajpay et al. | 370/245 |
| 2008/0159311 A1 * | 7/2008 | Martinotti et al. | 370/401 |
| 2009/0154340 A1 * | 6/2009 | Kumaresan et al. | 370/218 |

FOREIGN PATENT DOCUMENTS

| | | |
|---|---|---|
| CN | 1303557 A | 7/2001 |
| CN | 1391749 A | 1/2003 |
| WO | WO 01/37508 A2 | 5/2001 |

OTHER PUBLICATIONS

International Search Report dated Apr. 16, 2009 in connection with International Patent Application No. PCT/CN2009/070067.

* cited by examiner

*Primary Examiner* — Kwang B Yao
*Assistant Examiner* — Candal Elpenord

(57) ABSTRACT

A method for a network device to access a packet switched network is applied to a system in which the network device accesses the packet switched network by connecting to PEs in an active-standby mode. The method includes: an active PE and a standby PE each sends a fault detection message to the network device through an interface connected to the network device; the active PE sets the state of the interface to "up" and advertises a route to a remote PE if a fault detection response returned by the network device is received through the interface within a preset period; otherwise, the active PE sets the state of the interface to "down", and withdraws the advertised route; and the standby PE sets the state of the interface to "up" and advertises another route to the remote PE after receiving a fault detection response through the interface connected to the network device.

7 Claims, 2 Drawing Sheets

METHOD, SYSTEM, AND APPARATUS FOR NETWORK DEVICE TO ACCESS PACKET SWITCHED NETWORK

CROSS-REFERENCE TO RELATED APPLICATIONS

This application is a continuation of International Application No. PCT/CN2009/070067, filed on Jan. 7, 2009, which claims priority to Chinese Patent Application No. 200810001013.5, filed on Jan. 10, 2008, both of which are hereby incorporated by reference in their entireties.

TECHNICAL FIELD

The present invention relates to network technologies, and in particular, to a method, a system, and an apparatus for a network device to access a packet switched network, such as Internet Protocol (IP) network or Multi-Protocol Label Switching (MPLS) network (which is hereinafter referred to as "IP/MPLS network").

BACKGROUND

Currently, networks are developing rapidly. In any scenario, service providers strive to simplify the device, reduce device costs and device management costs, and improve the speed of service convergence in the case of failover.

In the prior art, a Next Generation Network (NGN) accesses a Provider Edge Router (PE) of the IP/MPLS network directly in an active-standby mode. The details about how an NGN device accesses the IP/MPLS network in an active-standby mode in the prior art are described below, taking a Multimedia Gateway (MGW) among NGN devices as an example.

FIG. 1 shows how an MGW accesses an IP/MPLS network in the prior art. As shown in FIG. 1, the MGW works in an active-standby mode, and is directly connected with two PEs (PE1 and PE2) of the IP/MPLS network. The active port on the MGW is connected with PE1 through active link 1 and active link 2, and the standby port is connected with PE2 through standby link 3 and standby link 4. Link 3 is a standby link of link 1, and link 4 is a standby link of link 2. Each active link and its corresponding standby link have the same IP address. Normally, the standby port of the MGW does not work, namely, does not receive or send messages. Therefore, standby links do not receive or send data streams. The active port of the MGW sends Address Resolution Protocol (ARP) request messages to PE1 periodically through the active link, and PE1 returns ARP response messages after receiving the ARP request messages. If the MGW does not receive the ARP response message from PE1 within a preset time, the MGW determines that the active link fails and triggers active-standby failover. That is, the standby port changes to an active port, and the standby link changes to an active link.

Virtual Router Redundancy Protocol (VRRP) and Virtual Private LAN Segment (VPLS) are applied on PEs. According to the VRRP, PE1 is set as an active device, PE2 is set as a standby device, and the interface IP address of PE1 is set as the virtual IP address of the VRRP. A loopback board is set inside the two PEs. That is, the active PE1 runs the physical port of the VRRP, and sends a VRRP multicast message periodically. The VRRP multicast message is carried by a VPLS and flooded to the physical port that runs the VRRP on PE2. If the standby PE receives no VRRP multicast message within three sending periods for sending VRRP multicast messages, the standby PE determines that the active PE fails, and triggers VRRP active-standby failover and the standby PE changes to a active PE. PE1 and PE2 are located in the same subnet, and each advertises routes to a remote PE3, as shown by dotted lines in FIG. 1.

Normally, the MGW forwards traffic to PE1 through an active port and the active link connected with the active port, and then PE1 forwards the traffic to PE3 or another PE through an IP/MPLS network.

Part of the return traffic sent from PE3 to PE1 through a route advertised by PE1 is directly forwarded to the MGW through the active link, as shown by the bidirectional arrow in FIG. 1.

Part of the return traffic sent from PE3 to PE2 through a route advertised by PE2 is transmitted to PE1 transparently through a VPLS network between PE2 and PE1, and then forwarded to the MGW through the active link, because the MGW standby interface connected with PE2 is unable to receive or send traffic, as shown by the unidirectional arrow in FIG. 1.

When the MGW detects that an active link fails, for example, active link 1 fails, the MGW triggers active-standby failover. And, the active port connected with active link 1 changes to a standby port, the old active link changes to a standby link which will not receive or send data any more, the standby port connected with standby link 3 changes to an active port, and the old standby link changes to an active link which begins receiving and sending messages. In this case, PE1 and PE2 still work normally, and the VRRP does not trigger active-standby failover. FIG. 2 shows how an MGW accesses an IP/MPLS network when active link 1 fails in the prior art. As shown in FIG. 2, the MGW sends traffic to PE2 through the active port and link 3. Because the VRRP does not trigger active-standby failover after the active-standby failover of the MGW, and PE2 is still standby, PE2 transmits the received traffic to the L3VPN (Layer 3 Virtual Private Networks) port of PE1 transparently through the VPLS network via L3VPN port of PE2, and then PE1 forwards the traffic to PE3 or other PEs.

Part of the return traffic sent from PE3 to PE2 through the route advertised by PE2 is forwarded to the MGW through the active link after failover and the active port after failover, as shown by the bidirectional arrow in FIG. 2.

Part of the return traffic sent from PE3 to PE1 through the route advertised by PE1 is transmitted to PE1 transparently through the VPLS network between PE2 and PE1 and then forwarded to the MGW through the active link after failover and the active port because the old active port after failover has changed to a standby port which will not receive or send messages any more, as shown by the unidirectional arrow in FIG. 2.

As described above, in the prior art, the MGW sends ARP detection messages to PE1, and receives ARP response messages returned by PE1 to detect the fault of the active link, and detects fault of the PE through VRRP.

If the physical link between PE1 and PE2 fails, normally PE2 is unable to forward the traffic received from the remote PE to PE1; after active-standby failover of the MGW, PE1 is unable to forward the traffic received from the remote PE to PE2, thus causing serious loss of service packets.

When the active link fails, the MGW undergoes active-standby failover. However, because PE1 does not fail, neither PE1 nor PE2 undergoes active-standby failover. Therefore, the sent traffic and a part of the return traffic need to be forwarded through active PE1, which increases the traffic forwarding time and slows down the service convergence.

Moreover, in the prior art, when the network device accesses the IP/MPLS network through a PE, a loopback board needs to be configured on the PE in order to run the VRRP and the VPLS, and therefore, the PE is rather complicated. In order to improve the reliability of the VPLS, two physical links need to be configured between PE1 and PE2 to ensure transparent transmission of the traffic of the VPLS network. That increases the device costs, probability of faults of the whole system, and device management costs.

Such problems also occur on other network devices which access the packet switched network in an active-standby mode.

SUMMARY

The embodiments of the present invention provide a method for a network device to access a packet switched network to reduce loss of service packets in the case of failover.

The embodiments of the present invention provide a system for a network device to access a packet switched network to reduce loss of service packets in the case of failover.

The embodiments of the present invention provide a PE to reduce loss of service packets in the case of failover.

The embodiments of the present invention provide a network device to reduce loss of service packets in the case of failover.

The objectives of the present invention are fulfilled through the following technical solution:

A method for a network device to access a packet switched network, the method is applied to a system in which the network device accesses the packet switched network by connecting to PEs in an active-standby mode. The method includes:

by an active PE, sending a fault detection message to the network device through the active PE's interface connected to the network device; by an standby PE, sending a fault detection message to the network device through the standby PE's interface connected to the network device;

by the active PE, setting the state of the active PE's interface connected to the network device to "up" and advertising a route to a remote PE if determining that a fault detection response is received through the active PE's interface connected to the network device within a preset period; setting the state of the active PE's interface connected to the network device to "down" and withdrawing the route advertised to the remote PE if determining that a fault detection response is not received through the active PE's interface connected to the network device within a preset period; and by the standby PE, setting the state of the standby PE's interface to "up" and advertising another route to the remote PE after receiving the fault detection response through the standby PE's interface connected to the network device.

A method for a network device to access a packet switched network, the method is applied to a system in which the network device accesses the packet switched network by connecting to PEs in an active-standby mode. The method includes:

by the network device, returning a fault detection response to an active PE if determining that a fault detection message sent by the active PE is received through an active port within a preset period; or changing a standby port corresponding to the active port over to an active port if determining that a fault detection message sent by the active PE is not received through the active port within a preset period; receiving the fault detection message sent by the standby PE through the active port after failover, and returning a fault detection response to the standby PE through the active port after failover.

A system for a network device to access a packet switched network is provided in an embodiment of the present invention, where the network device accesses the packet switched network by connecting to PEs in an active-standby mode. The system includes a network device, an active PE and a standby PE, wherein:

the network device is configured to: return a fault detection response to the active PE if determining that a fault detection message sent by the active PE is received from an active port within a preset period; change a standby port corresponding to the active port over to an active port if determining that a fault detection message sent by the active PE is not received from an active port within a preset period; receive the fault detection message sent by the standby PE through the active port after failover, and return a fault detection response to the standby PE through the active port after failover;

the active PE is configured to: send the fault detection message to the network device through the active PE's interface connected to the network device; and set the state of the active PE's interface connected to the network device to "up" and advertise a route to a remote PE if determining that a fault detection response is received through the active PE's interface connected to the network device within a preset period; set the state of the active PE's interface connected to the network device to "down" and withdraw the route advertised to the remote PE if determining that a fault detection response is not received through the active PE's interface connected to the network device within a preset period; and the standby PE is configured to: send the fault detection message to the network device through the standby PE's interface connected to the network device; and set the state of the standby PE's interface connected to the network device to "up" and advertise another route to the remote PE after receiving the fault detection response through the standby PE's interface.

A PE is provided in an embodiment of the present invention. The PE includes a fault detecting module, an interface state setting module and a route advertising module, wherein:

the fault detecting module is configured to: send a fault detection message to the network device through the PE's interface connected to the network device; and notify the interface state setting module that the interface state setting module needs to set the state of the PE's interface connected to the network device to "up" and notify the route advertising module that the route advertising module needs to advertise a route to a remote PE after receiving a fault detection response sent by the network device;

the interface state setting module is configured to set the state of the PE's interface connected to the network device to "up" under control of the fault detecting module; and the route advertising module is configured to advertise the route to the remote PE under control of the fault detecting module.

A network device is provided in an embodiment of the present invention. The network device includes a fault detecting module and an active-standby failover module, wherein:

the fault detecting module is configured to: return a fault detection response to an active PE if determining that a fault detection message sent by the active PE is received from an active port within a preset period; notify the active-standby failover module that the active-standby failover module needs to perform active-standby failover if determining that a fault detection message sent by the active PE is not received from an active port within a preset period; receive the fault detection message sent by the standby PE through the active port after failover, and return the fault detection response to the standby PE; and the active-standby failover module is configured to change the standby port corresponding to the active port over to an active port under control of the fault detecting module.

In the technical solution under the present invention, the active PE is connected to the active port of the network device, and the standby PE is connected to the standby port of the network device. Each of the active PE and the standby PE sends a fault detection messages to the network device through its interface connected to the network device; the active PE or the standby PE sets the state of its interface connected to the network device to "up" and advertise a route to the remote PE if a fault detection response is received from the network device through its interface connected to the network device within the preset period. The active PE or the standby PE sets the state of its interface connected to the network device to "down" and withdraws the route advertised to the remote PE if a fault detection response is not received from the network device through its interface connected to the network device within the preset period. Therefore, the technical solution under the present invention brings the following benefits:

(1) When the state of the outgoing interface connected to the network device is up (the outgoing interface is an interface of a PE), the PE advertises a route to the remote PE; when the state of the outgoing interface connected to the network device changes to a "down" state, the PE withdraws the route advertised to the remote PE. In this way, the remote PE can send a returned traffic to a PE connected to the active port of the network device directly in normal circumstances or after completion of failover, and the traffic does not need to be forwarded between PEs, thus reducing loss of service packets in the case of link failure between the PEs.

(2) The PE sends a fault detection message to the network device, and the network device judges whether the active link and the PE fail. In this way, the detection mechanism replaces the VRRP detection that is used on the PE in the prior art. Therefore, when the active link fails and the MGW undergoes active-standby failover, the state of the outgoing interface of the PE is linked with the active-standby failover of the MGW, and the advertising of the route is controlled. When faults occur, the traffic sent to the packet switched network and the traffic returned from the remote PE are forwarded only through the PE connected to the active port of the MGW, thus shortening the traffic forwarding time and speeding up the service convergence.

(3) In the embodiments of the present invention, the fault detection between the PE and the network device replaces the VRRP detection between the PEs, the PE does not need to run the VRRP and the VPLS concurrently, and no loopback board is required, thus simplifying the device and reducing the costs of configuring and managing the PEs.

DETAILED DESCRIPTION

The present invention is elaborated below with reference to the accompanying drawings and exemplary embodiments.

In a method for a network device to access a packet switched network in an embodiment of the present invention, an active PE is connected to the active port of the network device and a standby PE is connected to the standby port of the network device. Each of the active PE and the standby PE sends fault detection messages to the network device through its interface connected to the network device. The active PE sets the state of the active PE's interface connected to the active port of the network device to "up" and advertises a route to a remote PE if a fault detection response returned by the network device is received through the active PE's interface connected to the active port of the network device within a preset period; if a fault detection response returned by the network device is not received through the active PE's interface connected to the active port of the network device within a preset period, the active PE sets the state of the active PE's interface connected to the active port of the network device to "down", and withdraws the route advertised to the remote PE. The standby PE sets the state of the standby PE's interface connected to the standby port of the network device to "up" and advertises another route to the remote PE after receiving a fault detection response through the standby PE's interface connected to the standby port of the network device.

The method in an exemplary embodiment of the present invention is detailed below, assuming that the network device is an MGW.

Figure 1:
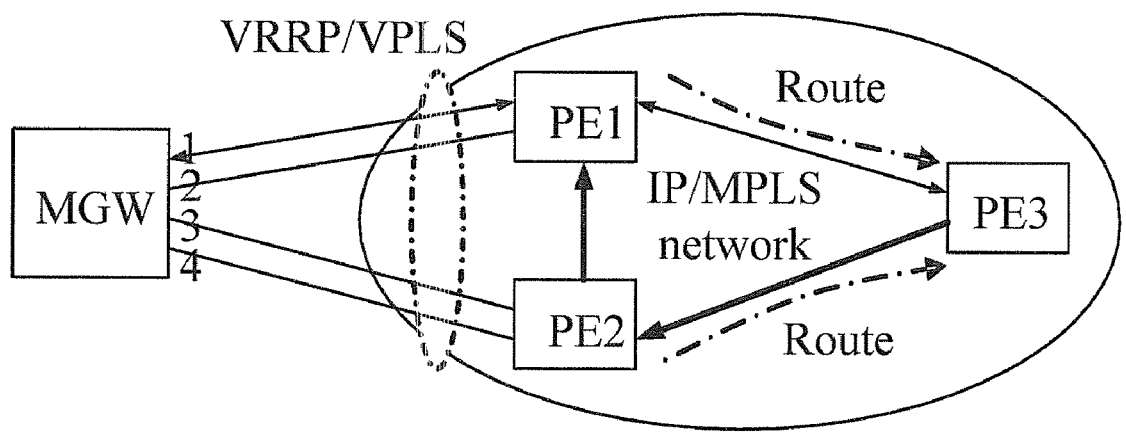
FIG. 1 shows how an MGW accesses an IP/MPLS network in the prior art.
Figure 2:
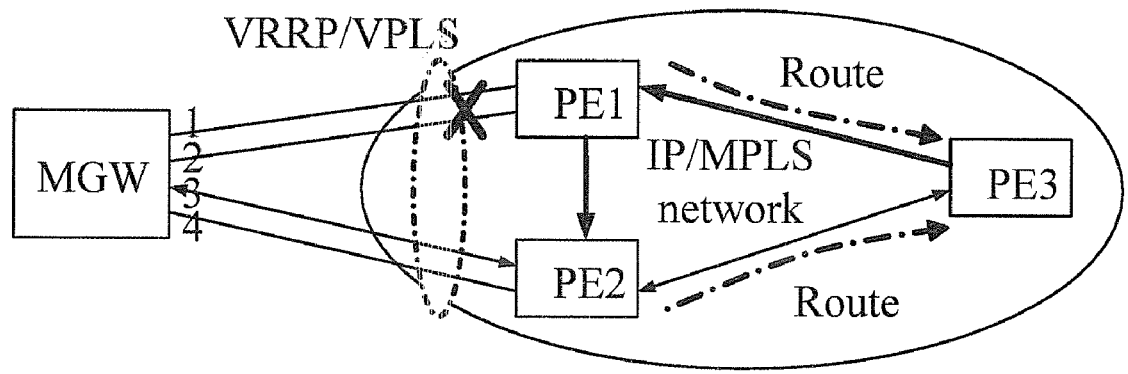
FIG. 2 shows how an MGW accesses an IP/MPLS network when active link 1 fails in the prior art.
Figure 3:
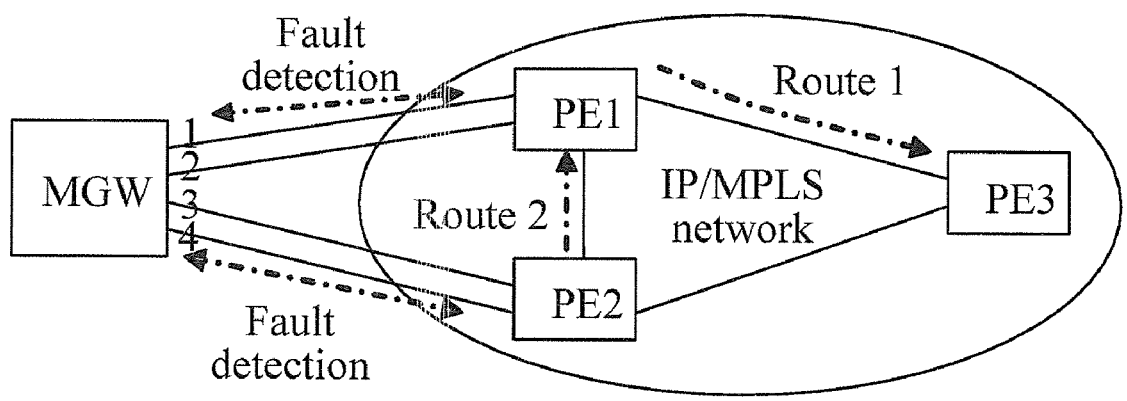
FIG. 3 shows how an MGW accesses an IP/MPLS network in an embodiment of the present invention.

FIG. 3 shows how an MGW accesses an IP/MPLS network in an embodiment of the present invention. As shown in FIG. 3, the MGW works in an active-standby mode, and is directly connected with two PEs (PE1 and PE2) of the IP/MPLS network. The active port on the MGW is connected with PE1 through active link 1 and active link 2, and the standby port on the MGW is connected with PE2 through standby link 3 and standby link 4. Link 3 is a standby link of active link 1, and link 4 is a standby link of active link 2. The standby port of the MGW does not work, namely, does not receive or send messages. Therefore, standby links do not receive or send of traffic.

When the MGW and PE1 begin to work normally, taking active link 1 as an example, PE1 sends fault detection messages to the MGW periodically through active link 1, and the MGW returns a fault detection response after receiving the fault detection message through the active port corresponding to the active link 1. If PE1 receives the fault detection response within a preset period such as three periods of fault detection, PE1 sets the state of its outgoing interface (namely, the interface connected to the active port of the MGW through active link 1) to "up", and sends route 1 directed to the MGW (shown by the dotted line in FIG. 3) to the remote PE.

PE2 sends a fault detection message to the MGW periodically through the standby link. Because the standby port of the MGW does not work, it is unable to receive the fault detection message, and unable to return a fault detection response to PE2. PE2 receives no fault detection message within a preset period such as three periods of fault detection, and therefore, sets the state of its outgoing interface (namely, the interface connected to the MGW through the standby link) to "down", thus suppressing advertising of the route.

In the normal working process, PE1 receives the fault detection response from the active link within the preset period, and performs no actions, namely, keeps the "up" state of the outgoing interface that connects PE1 with the active link. The MGW sends traffic to PE1 through the active port and the active link, and PE1 forwards the traffic to the IP/MPLS network. As regards the traffic returned from the remote PE, because PE2 does not advertise any route to the remote PE, the remote PE has to route the traffic to PE1 through route 1 advertised by PE1, and then PE1 sends the traffic to the MGW through the active link and the active port of the MGW.

When the active link fails (for example, active link 1 fails), the MGW receives no fault detection message through the active port connected to the active link within the preset period, and therefore, perceives that the active link fails, and triggers failover from the old active port to a standby port and failover from the old standby port to an active port. Accordingly, the old active link changes over to a standby link, and the old standby link changes over to an active link.

Figure 4:
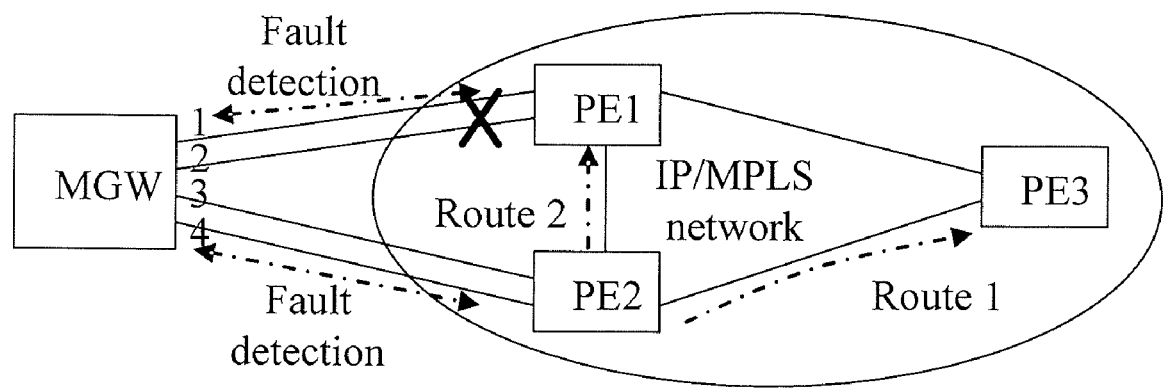
FIG. 4 shows how an MGW accesses an IP/MPLS network when the active link fails in an embodiment of the present invention.

FIG. 4 shows how an MGW accesses an IP/MPLS network when the active link fails in an embodiment of the present invention. As shown in FIG. 4, after changing the old standby port over to an active port, the MGW can receive the fault detection message sent by PE2 through the active link after failover, and return a fault detection response to PE2. After receiving the fault detection response within the preset period, PE2 sets the state of its outgoing interface (namely, the interface that connects PE2 with the active link after failover) to "up", and advertises route 1 corresponding to the active link after failover to the remote PE, as shown by the dotted line in FIG. 4. After changing the old active port over to a standby port, the MGW is unable to receive the fault detection message sent by PE1 or return a fault detection response. If not receiving the fault detection response from the MGW within a preset period, PE1 sets the state of its outgoing interface to "down", and withdraws the route sent to the remote PE.

The MGW sends traffic to PE2 through the active port after failover, and PE2 forwards the traffic to the IP/MPLS network. As regards the traffic returned from the remote PE, because the route advertised by PE1 is withdrawn and a new route is advertised by PE2, the remote PE routes the returned message to PE2 through the route advertised by PE2, and PE2 sends the message to the MGW.

The fault detection mechanism between the MGW and the PE may be an ARP detection mechanism, and the corresponding fault detection message is an ARP request and the corresponding fault detection response is an ARP response. Once the PE receives an ARP response within the preset period, the PE sets the state of its outgoing interface (namely, the interface that connects PE with the link for receiving the ARP response) to "up", and advertises a route to the remote PE. If no ARP response is received within the preset period, the PE sets the state of its outgoing to "down", and withdraws the route advertised to the remote PE.

Alternatively, the fault detection mechanism between the MGW and the PE is a Bidirectional Forwarding Detection (BFD) mechanism, and the corresponding processing is: The PE sends a BFD control message to the MGW periodically, and the MGW returns a BFD control message to the PE. After receiving the BFD control message, the PE negotiates with the MGW to create a BFD session, and sets the state of its outgoing interface to "up". The state control for the outgoing interface and the process of advertising a route after state change in the BFD mechanism are the same as those in the ARP fault detection mechanism.

Therefore, the fault detection of the link between the MGW and the PE is linked with the outgoing interface of the PE connected with the MGW, the active/standby state of the PE is consistent with that of the MGW, both the traffic sent to the remote PE and the traffic returned by the remote PE can be forwarded through the PE corresponding to the active port, and therefore the traffic forwarding time is shortened, and the service convergence is quickened.

Meanwhile, the ARP detection or BFD mechanism for the link between the PE and the MGW takes the place of the VRRP detection. Therefore, the PE perceives the fault more quickly, and the standby PE can change its outgoing interface state quickly with the active-standby failover of the MGW to control the route advertising. In this way, the loss of service packets in the case of failover is reduced.

In order to further reduce the loss of return traffic during failover, normally PE2 can advertise another route whose outgoing interface is NULL0 to PE1, for example, route 2 shown by the dotted line in FIG. 3 and FIG. 4. Normally, route 2 stored in the routing table of PE1 is of the lowest priority. Therefore, route 2 is not selected for the return traffic from the remote PE to PE1. However, once a fault occurs, the route between PE1 and the MGW fails, and PE1 selects a valid route of lower priority. In this way, PE1 can forward the return traffic to PE2 through route 2. PE2 forwards the traffic from PE1 to the MGW after the MGW undergoes active-standby failover and the standby link between the MGW and PE2 is available. In this way, the loss of service packets during failover is further reduced.

Figure 5:
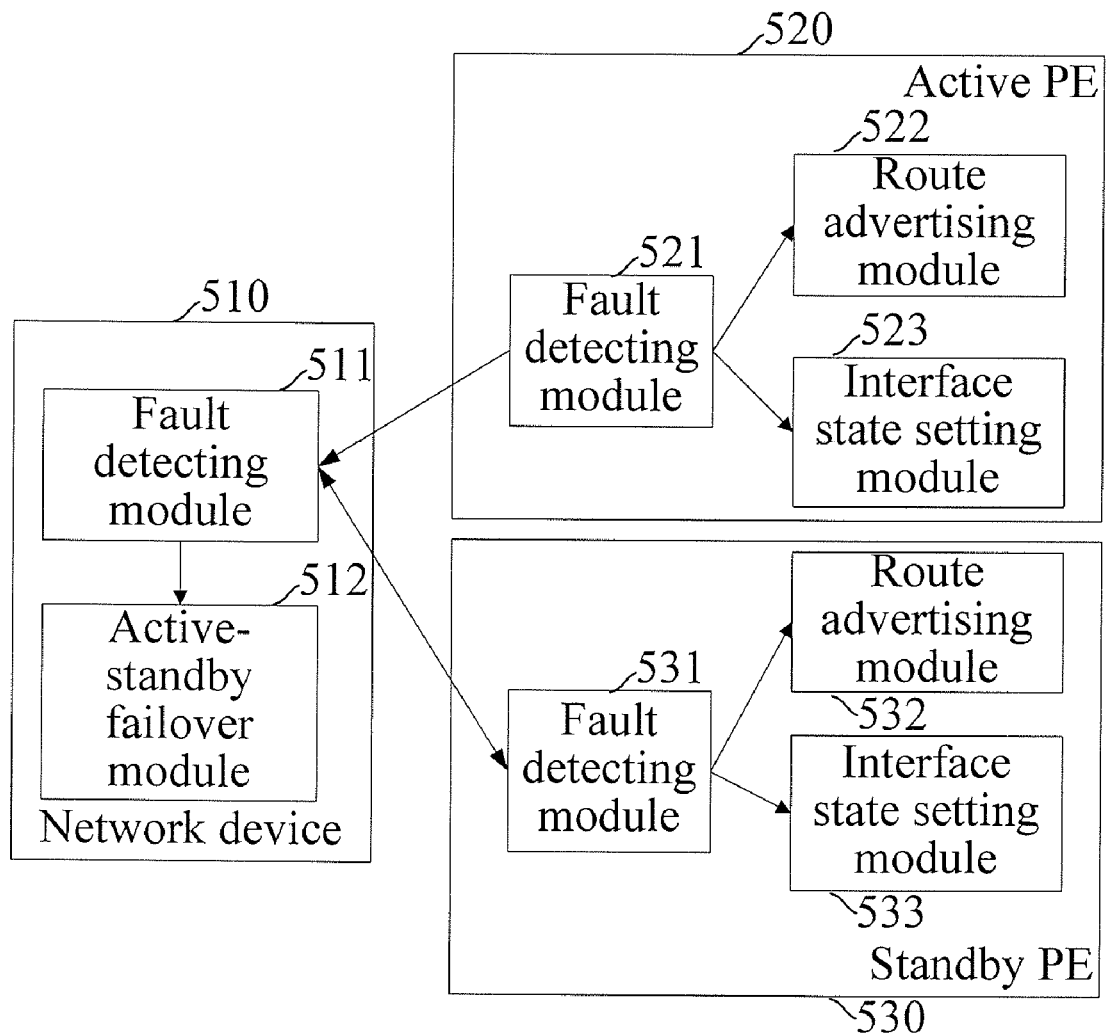
FIG. 5 shows a structure of a system for a network device to access an IP/MPLS network in an embodiment of the present invention.

FIG. 5 shows a structure of a system for a network device to access an IP/MPLS network in an embodiment of the present invention. As shown in FIG. 5, the system includes a network device 510, an active PE 520, and a standby PE 530.

The network device 510 is configured to: return a fault detection response to an active PE 520 if determining that a fault detection message sent by the active PE 520 is received from an active port within a preset period; if determining that a fault detection message sent by the active PE 520 is not received from an active port within a preset period, change a standby port corresponding to the active port over to an active port; receive the fault detection message sent by the standby PE 530 through the active port after failover, and return a fault detection response to the standby PE 530 through the active port after failover.

The active PE 520 is configured to: send the fault detection message to the network device 510 through its interface connected to the network device 510; and set the state of the interface to "up" and advertise a route to a remote PE if determining that a fault detection response is received through the interface within a preset period; set the state of the interface to "down", and withdraw the route advertised to the remote PE if determining that a fault detection response is not received through the interface within a preset period.

The standby PE 530 is configured to: send the fault detection message to the network device 510 through its interface connected to the network device 510; and set the state of the interface to "up" and advertise a route to the remote PE after receiving the fault detection response returned by the network device 510 through the interface.

The standby PE 530 is further configured to advertise another route whose outgoing interface is NULL0 to the active PE 520. In this way, when the PE 520 determines that the active link fails, namely, if the active PE 520 receives no fault detection response returned by the network device 510 within a preset period, the active PE 520 sends the traffic received from the remote PE to the standby PE 530 through the route whose outgoing interface is NULL0, thus further reducing loss of service packets in the case of failover.

Specifically, the network device 510 includes an active-standby port failover module 512 and a fault detecting module 511.

The fault detecting module 511 is configured to: return a fault detection response to an active PE 520 if determining that a fault detection message sent by the active PE 520 is received from an active port within a preset period; if determining that a fault detection message sent by the active PE 520 is not received from an active port within a preset period, notify the active-standby failover module 512 that the active-standby failover module 512 needs to perform active-standby failover; receive the fault detection message sent by the standby PE 530 through the active port after failover, and return the fault detection response.

The active-standby failover module 512 is configured to change the standby port corresponding to the active port over to an active port under control of the fault detecting module 511.

The active PE 520 includes a fault detecting module 521, an interface state setting module 523, and a route advertising module 522.

The fault detecting module 521 is configured to: send a fault detection message to the network device 510 through the active PE 520's interface connected to the network device 510; and notify the interface state setting module 523 that the interface state setting module 523 needs to set the state of the interface to "up" and notify the route advertising module 521 that the route advertising module 521 needs to advertise a route to the remote PE if a fault detection response sent by the network device 510 is received within a preset period; if a fault detection response sent by the network device 510 is not received within a preset period, notify the interface state setting module 523 that the interface state setting module 523 needs to set the state of the interface to "down", and notify the route advertising module 521 that the route advertising module 521 needs to withdraw the route advertised to the remote PE.

The interface state setting module 523 is configured to set the state of the interface to "up" or "down" under control of the fault detecting module 521.

The route advertising module 522 is configured to advertise a route to the remote PE or withdraw the route advertised to the remote PE under control of the fault detecting module 521.

Accordingly, the standby PE 530 includes a fault detecting module 531, an interface state setting module 533, and a route advertising module 532.

The fault detecting module 531 is configured to: send a fault detection message to the network device 510 through the standby PE 530's interface connected to the network device 510; and notify the interface state setting module 533 that the interface state setting module 533 needs to set the state of the interface to "up" and notify the route advertising module 532 that the route advertising module 532 needs to advertise a route to the remote PE after receiving a fault detection response sent by the network device 510.

The interface state setting module 533 is configured to set the state of the interface to "up" under control of the fault detecting module 531.

The route advertising module 532 is configured to advertise a route to the remote PE under control of the fault detecting module 531.

The route advertising module 532 is further configured to send another route whose outgoing interface is NULL0 to the active PE 520.

In the technical solution under the present invention, the PEs connected to the active port and the standby port of the network device each sends fault detection messages to the network device through the interface connected to the network device; set the state of the interface connected to the network device to "up" and advertise a route to the remote PE if a fault detection response is received from the network device through the interface connected to the network device within the preset period; set the state of the interface connected to the network device to "down" and withdraw the route advertised to the remote PE if a fault detection response is not received from the network device through the interface connected to the network device within the preset period. Therefore, the technical solution under the present invention brings the following benefits:

(1) When the outgoing interface of PE connected to the network device is up, the PE advertises a route to the remote PE; when the outgoing interface connected to the network device changes to a "down" state, the PE withdraws the route advertised to the remote PE. In this way, the remote PE can send the returned traffic to the PE connected to the active port of the network device directly in normal circumstances or after completion of failover, and the traffic does not need to be forwarded between PEs, thus reducing loss of service packets in the case of link failure between the PEs.

(2) The PE sends a fault detection message to the network device, and the network device judges whether the active link and the PE fail. In this way, the detection mechanism replaces the VRRP detection that is used on the PE in the prior art. Therefore, when the active link fails and the MGW undergoes active-standby failover, the outgoing interface of the PE and the advertised route are linked with the active-standby failover of the MGW. When faults occur, the traffic sent to the packet switched network and the traffic returned from the remote PE are sent to the PE connected to the active port of the network device directly, and forwarded by this PE, thus shortening the traffic forwarding time and speeding up the service convergence.

(3) In the embodiments of the present invention, the fault detection between the PE and the network device replaces the VRRP detection between the PEs, the PE does not need to run the VRRP and the VPLS concurrently, and no loopback board is required, thus simplifying the device and reducing the costs of configuring and managing the PEs.

(4) The VRRP fault detection in the prior art takes a long time, which is generally 3 s. Through the VRRP, when the active PE fails, it takes a longtime for the standby PE to perceive the fault, and the active-standby failover of the VRRP is slow, which leads to serious loss of service packets in the case of failover. By contrast, in the embodiments of the present invention, an ARP detection mechanism or BFD mechanism between the PE and the network device takes the place of the VRRP detection between the PEs. The fault detection time based on the ARP detection mechanism or BFD mechanism is shorter than the fault detection time based on VRRP. Therefore, when the active PE fails and the MGW undergoes active-standby failover, the standby PE changes its own outgoing interface to the "up" state immediately, thus improving the failover speed of the PE and reducing loss of service packets in the case of failover. Moreover, no VRRP link exists between the PEs, thus eliminating exception of active-standby failover.

(5) In the embodiments of the present invention, the standby PE sends a route whose outgoing interface is NULL0 to the active PE. Therefore, in the failover process, the message sent to the active PE can be forwarded to the standby PE through the route whose outgoing interface is NULL0, and forwarded by the standby PE to the network device after completion of the failover, thus further reducing loss of service packets in the failover process.

After reading the foregoing embodiments, those skilled in the art are clearly aware that the present invention may be implemented through hardware, or through software in addition to a necessary universal hardware platform. The technical solution under the present invention may be embodied as a software product. The software product may be stored in a non-volatile storage medium (such as CD-ROM, USB flash disk, or mobile hard disk), and may include several instructions that enable a computer device (such as personal computer, server, or network device) to perform the methods provided in the embodiments of the present invention.

The above descriptions are merely exemplary embodiments of the present invention, but not intended to limit the scope of the present invention. Any modification, equivalent replacement, or improvement made without departing from the spirit and principle of the present invention should fall within the scope of the present invention.

What is claimed is:

1. A method for a network device to access a packet switched network, wherein the method is applied to a system in which the network device accesses the packet switched network by connecting to Provider Edge Routers (PEs) in an active-standby mode, and the method comprises:
   sending, by an active PE a fault detection message to the network device through the active PE's interface connected to the network device; sending, by an standby PE a fault detection message to the network device through the standby PE's interface connected to the network device;
   setting, by the active PE, a state of the active PE's interface connected to the network device to "up" and advertising a first route to a remote PE if determining that a fault detection response is received through the active PE's interface connected to the network device within a preset period; setting the state of the active PE's interface connected to the network device to "down", and withdrawing the first route advertised to the remote PE if determining that a fault detection response is not received through the active PE's interface connected to the network device within the preset period; and
   setting, by the standby PE, the state of the standby PE's interface to "up" and advertising a second route to the remote PE after receiving the fault detection response through the standby PE's interface connected to the network device.

2. The method of claim 1, wherein:
the fault detection message is an Address Resolution Protocol (ARP) request and the fault detection response is an ARP response; or
the fault detection message and the fault detection response are Bidirectional Forwarding Detection (BFD) control messages.

3. The method of claim 1, further comprising:
sending, by the standby PE connected with a standby port of the network device, a third route whose outgoing interface is NULL0 to the active PE connected with an active port of the network device.

4. A system for a network device to access a packet switched network, wherein the network device accesses the packet switched network by connecting to Provider Edge Routers (PEs) in an active-standby mode, and the system comprises the network device, an active PE and a standby PE, wherein,
the network device is configured to: return a fault detection response to the active PE if determining that a fault detection message sent by the active PE is received from an active port within a preset period; change a standby port corresponding to the active port over to an active port if determining that a fault detection message sent by the active PE is not received from the active port within the preset period; receive a fault detection message sent by a standby PE through the active port after failover, and return a fault detection response to the standby PE through the active port after the failover;
the active PE is configured to: send the fault detection message to the network device through the active PE's interface connected to the network device; and set a state of the active PE's interface connected to the network device to "up" and advertise a first route to a remote PE if determining that the fault detection response is received through the active PE's interface connected to the network device within the preset period; set the state of the active PE's interface connected to the network device to "down", and withdraw the first route advertised to the remote PE if determining that the fault detection response is not received through the active PE's interface connected to the network device within the preset period; and
the standby PE is configured to: send the fault detection message to the network device through the standby PE's interface connected to the network device; and set the state of the standby PE's interface connected to the network device to "up" and advertise a second route to the remote PE after receiving the fault detection response through the standby PE's interface.

5. The system of claim 4, wherein:
the standby PE is further configured to advertise a third route whose outgoing interface is NULL0 to the active PE.

6. A Provider Edge Router (PE), comprising a fault detecting module, an interface state setting module and a route advertising module, wherein:
the fault detecting module is configured to: send a fault detection message to a network device through the PE's interface connected to the network device, notify the interface state setting module that the interface state setting module needs to set a state of the PE's interface connected to the network device to "up", and notify the route advertising module that the route advertising module needs to advertise a route to a remote PE after receiving a fault detection response sent by the network device within a preset period, and notify the interface setting module that the interface setting module needs to set the state of the PE's interface connected to the network device to "down" and notify the route advertising module that the route advertising module needs to withdraw the route advertised to the remote PE if no fault detection response returned by the network device is received within the preset period;
the interface state setting module is configured to set the state of the PE's interface connected to the network device to "up" under control of the fault detecting module, and set the state of the PE's interface connected to the network device to "down" under control of the fault detecting module; and
the route advertising module is configured to advertise the route to the remote PE under control of the fault detecting module, and withdraw the route advertised to the remote PE under control of the fault detecting module.

7. The PE of claim 6, wherein:
the PE is a standby PE, the route advertising module of the standby PE is further configured to send another route whose outgoing interface is NULL0 to a corresponding active PE.

* * * * *